United States Patent [19]
Davies

[11] Patent Number: 6,031,949
[45] Date of Patent: Feb. 29, 2000

[54] OPTICAL DATA COMMUNICATION SYSTEM

[75] Inventor: Mark Davies, Limerick, Ireland

[73] Assignee: Forfas, Dublin, Ireland

[21] Appl. No.: 08/826,231

[22] Filed: Mar. 27, 1997

[30] Foreign Application Priority Data

Mar. 27, 1996 [IE] Ireland ................................. S96 0251

[51] Int. Cl.[7] .................................................. G02B 6/26
[52] U.S. Cl. ............................................................ 385/26
[58] Field of Search ................................................ 385/26

[56] References Cited

U.S. PATENT DOCUMENTS

| | | | |
|---|---|---|---|
| 3,809,815 | 5/1974 | Reed et al. | 179/15 FD |
| 4,190,318 | 2/1980 | Upton, Jr. | 350/96.2 |
| 4,278,323 | 7/1981 | Waldman | 350/96.2 |
| 4,519,670 | 5/1985 | Spinner et al. | 350/96.15 |
| 4,749,249 | 6/1988 | Hockaday et al. | 350/96.2 |
| 4,753,506 | 6/1988 | Einhorn et al. | 350/96.15 |
| 4,837,556 | 6/1989 | Matsushita et al. | 340/310 R |
| 4,943,137 | 7/1990 | Speer | 350/96.18 |
| 4,958,904 | 9/1990 | Rawski | 350/96.2 |

FOREIGN PATENT DOCUMENTS

| | | | |
|---|---|---|---|
| 0045585A1 | 7/1981 | European Pat. Off. | 385/26 |
| 0 490 054 | 6/1992 | European Pat. Off. | G02B 6/36 |
| 2 109 189A | 10/1981 | United Kingdom | 385/26 |
| 2109189A | 10/1981 | United Kingdom | 385/25 |
| WO85/02270 | 11/1984 | WIPO | 385/26 |
| 90/10979 | 9/1990 | WIPO | H04B 10/12 |

OTHER PUBLICATIONS

Esser et al., "Contactless High Speed Signal Transmission Integrated in a Compact Rotatable Power Transformer", Eurpoean Power Electronics Association. Sep. 1993 pp. 409–414.

Tsao et al., "Design of a Self–Routing Frequency Divison Multiple Access(SR–FDMA) Network Using an Optical Ring Filter with or without Gain as a Router", Journal of Lightwave Technology, vol. 13, No. 11, Nov. 1995, pp. 2168–2182.

"Optoelectronic transmission systm fro rotary machines", Research Disclosure, vol. 165, No. 16503, Jan. 1978.

*Primary Examiner*—John D. Lee
*Assistant Examiner*—Victoria D. Hao
*Attorney, Agent, or Firm*—Jacobson, Price, Holman & Stern, PLLC

[57] ABSTRACT

An optical slip ring system (1) has a rotor interface (2) which can bolt on to a high speed rotor in a modular manner. The rotor interface (2) has circular circuit boards (7) containing the necessary drive circuits and power supply circuits for transducers mounted on the rotor. The drive circuit on the boards (7) drive three rings of emitter LEDs (9). The drive is frequency modulated and there are a number of transducers associated with each ring of emitter LEDs (9). These signals are frequency division multiplexed to ensure real time processing takes place. A fixed support (3) has a single receiver LED (15) associated with each ring of emitter LEDs (9). Contactless power is provided by an inductive power supply having a primary winding (16) on the fixed support bracket (3) and a secondary winding (10) on the rotor interface (2).

17 Claims, 4 Drawing Sheets

OPTICAL DATA COMMUNICATION SYSTEM

BACKGROUND OF THE INVENTION

The invention relates to an optical slip ring for communication of data with a rotor, the slip ring comprising at least one light emitter mounted on the rotor or on an adjacent fixed support, at least one light receiver on the other of the rotor or fixed support, a drive means for delivering data signals to each emitter, and a receiver means for receiving signals from each light receiver and providing an output signal. The term "high speed" rotor is intended to cover rotors having a speed in excess of 5000 rmp with continuous rotation.

Methods of transmitting data across a rotary interface involve use of direct mechanical contact or optical technologies. Mechanical contact/rubbing methods, such as brush, wire, sliding and mercury wetted contacts, are subject to a number of disadvantages. Contact jitter, vibration and environmental noise all contribute to noise levels in the transmitted signal. Dirt accumulation and wear necessitate periodic maintenance and low speeds and lifetimes are also dictated by wear. Each circuit will contain differing values of contact resistance which will change over the individual contacts' lives. It is also difficult to obtain a relatively high density of channels compared to length on the axis of rotation.

Regarding optical slip rings, systems such as those described in U.S. Pat. Nos. 4,519,670 and 4,943,137 involve use of complex light control elements such as lenses and diffractive gratings. A system based on colour multiplexing is described in British Patent Specification NO. GB 2,109, 189 in which signals are passed through optical fibres. WO 85/02270 and EP 45585 also describe systems based on use of optical fibres. It appears that such systems would have a limited range of application because of the limitations imposed by use of fibres rotation, alignment of joints, and their fragile nature generally.

U.S. Pat. Nos. 4,190,318 and 4,958,904 describe optical slip ring arrangements in which rather complex arrangements of emitters and receivers are used to ensure that there is effective signal transmission at all times. For example, FIG. 7 of U.S. Pat. No. 4,190,318 shows superimposition of signal intensity for a uniform signal level. A very large number of receivers are used in the arrangement described in U.S. Pat. No. 4,958,904.

U.S. Pat. No. 4,278,323 describes an optical slip ring for very low speed applications such as rotation of a tank turret. An optical fibre arrangement is used, which does not appear to be suitable for high speed applications.

There is therefore a need for an optical slip ring which is suitable for high speed applications to such as turbine rotors, in which there may be a very high data throughput. An example is capture of data from strain gauges on rotating turbine blades in which the data transfer should allow analysis of the blade resonant frequencies. The system must be capable of processing captured data in real time.

SUMMARY OF THE INVENTION

According to the invention, there is provided an optical slip ring for communication of data with a rotor, the slip ring comprising at least one light emitter mounted on the rotor or on an adjacent fixed support, at least one light receiver on the other of the rotor or fixed support, a drive means for delivering data signals to each emitter, and a receiver means for receiving signals from each light receiver and providing an output signal, characterised in that, each light emitter comprises means for emitting light in field diverging at an angle of at least 30°, the drive means comprises means for supplying frequency modulated drive signals to each light emitter, and the receiving means comprises means for de-modulating said frequency modulated signals.

Because each light source has a diverging field, it can be mounted so that a detector detects signal at all times as the rotor rotates. The fact that this signal is received from varying distances between the emitter and the detector as the rotor rotates does not affect the quality of the signal as it is frequency-modulated (the frequency of light source flashing providing the signal).

In one embodiment, the modulation frequency is at least 500 kHz

Preferably, the angle of divergence of emitted light is at least 120°.

In one embodiment, there are a plurality of emitters arranged in a ring about the rotor axis of rotation at a spacing such that the emission fields overlap.

Preferably, there are a plurality of rings of emitters.

In one embodiment, the slip ring comprises means for differentiating signals from adjacent rings.

In one embodiment, the emitters of adjacent rings operate at mutually different colour wavelengths.

In one embodiment, said differentiation means comprises light filters mounted adjacent the receivers.

In another embodiment, the drive means comprises means for connection to a plurality of signal sources, and means for frequency-division multiplexing the data signals delivered to each emitter.

Preferably, the drive means comprises means for multiplexing with a guard to channel bandwidth ratio of approximately 1:1.

In one embodiment, said receiving means comprises passive band pass filters for demultiplexing the data signal, and preferably the filters are of the Butterworth type.

In another embodiment, the slip ring comprises a rotor interface comprising means for attachment to the rotor and for supporting the drive means and each light emitter, and a fixed support on which the light receiver and the receiving means are mounted.

In one embodiment, the slip ring further comprises a fixed support for each light receiver and the receiving means, and means for moving the support relative to the rotor interface.

Preferably, the rotor interface comprises a flange for on-axis connection to the rotor.

Ideally, the slip ring fixed support is in the form of a sleeve shaped to surround part of the rotor interface.

In one embodiment, the slip ring further comprises an electrical field-coupled power supply for contactless transfer of power to components on the rotor interface.

In another embodiment, the power supply is inductive and comprises a primary AC winding on the fixed support and a secondary winding on the rotor interface.

In another embodiment, the rotor interface comprises a DC rectifier and power regulation circuit.

Ideally, circuits of the rotor interface are mounted on at least one circuit board which is substantially circular in shape and mounted about the axis of rotation.

BRIEF DESCRIPTION OF THE DRAWINGS

The invention will be more clearly understood from the following description of some embodiments thereof, given by way of example only, with reference to the accompanying drawings, in which.

DETAILED DESCRIPTION OF THE PREFERRED EMBODIMENTS

Figure 1:
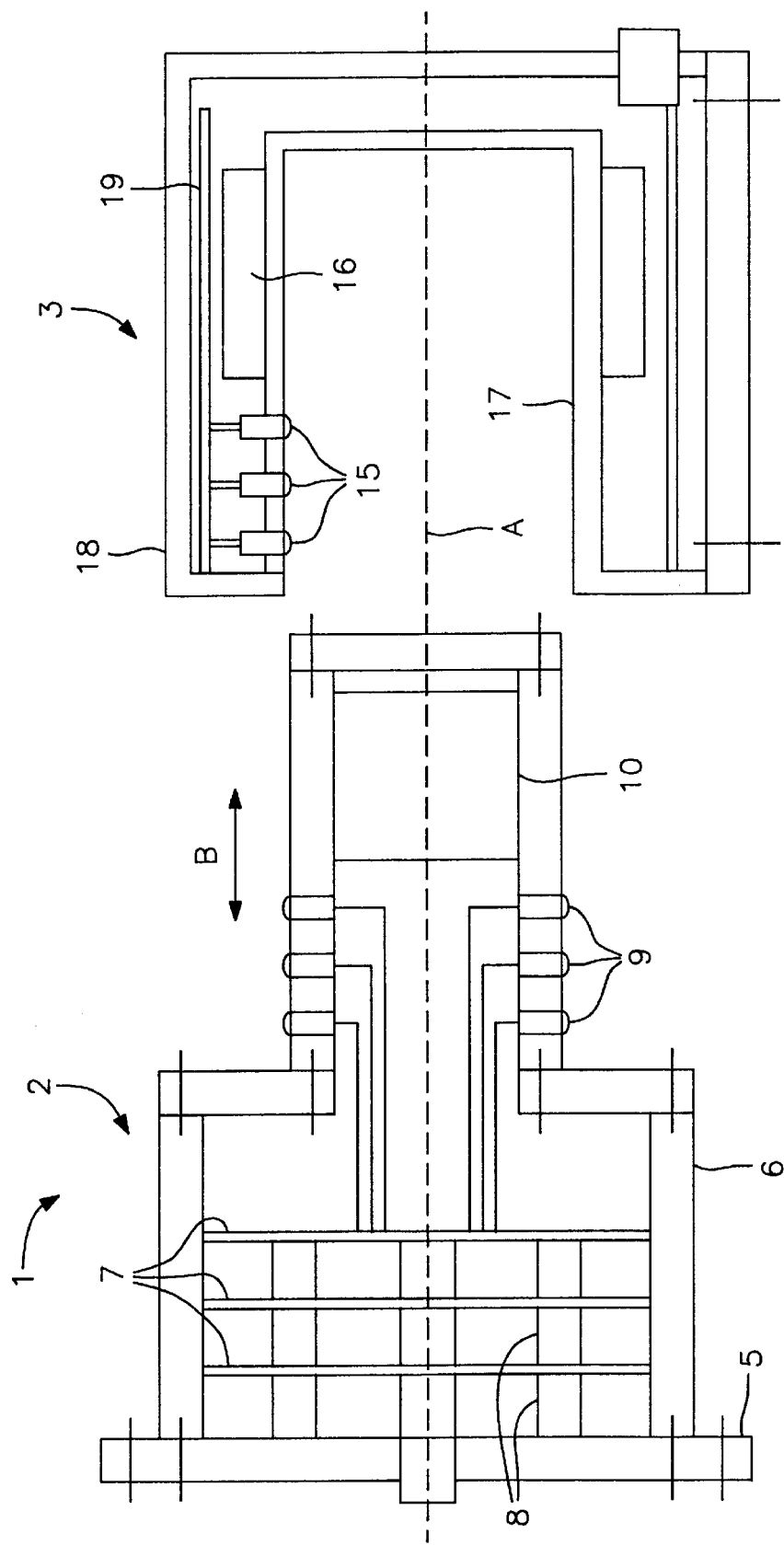
FIG. 1 is a schematic representation of the mechanical construction of an optical data communication system of the invention.

Referring to the drawings, and initially to FIG. 1 there is shown an optical data communication system 1 of the invention. The system 1 comprises a rotor interface 2 and a fixed support 3. The rotor interface 2 comprises a flange 5 which allows the system to be bolted in a modular manner on to the rotor of a high speed rotating system. The rotor interface 2 comprises a stepped cylindrical housing 6 having a wider portion adjacent the flange 5. This wider portion houses in this embodiment three circuit boards 7 which are circular in shape and are mounted centrally on the axis A of rotation of the rotor interface 2. The circuit boards 7 are supported on a set of pillars 8 arranged in a ring around the axis A and are parallel to it. The circuits 7 are connected to transducers on the rotor of the rotating system by electrical links through the flange.

The narrower part of the rotor interface 2 supports three rings of light emitters, namely emitter LEDs 9. These are driven by a drive circuit on the circuit board 7 in response to the output of the transducers on the rotor of the rotating system. A typical example of such transducers is a set of strain gauges on rotating turbine blades to monitor the response of the blades to engine driving frequencies. Other transducer examples for turbine applications are pressure transducers, thin film heat transfer gauges, and thin film shear stress gauges, Such measurements are widely used in conjunction with mechanical slip rings or telemetry systems. As is described in more detail below, each of the three rings of light, emitter LEDs 9 is associated with a single signal, which in this embodiment is multiplexed. Thus, there is one set of transducers associated with the first ring, another set of transducers is associated with the second ring, and a third set associated with the third ring. The rotor interface 2 also comprises an AC secondary winding 10 for receiving power in a contactless manner.

The fixed support 3 can slide in to and out of proximity with the rotor interface 2, as indicated by the arrow B. The fixed support 3 supports three light receivers, namely receiving LEDs 15. There is one receiver LED 15 associated with each ring of emitter LEDs 9. The fixed support 3 also supports a primary AC winding 16 of an induction power supply. The receiver LEDs 15 and the winding 16 are mounted about a cylindrical drum 17 which forms a sleeve which can surround the narrow portion of the rotor interface 2. When it slides into position, the receiver LEDs are in alignment with the rings of emitter LEDs 9 and the primary winding 16 is in alignment with the secondary winding 10.

The fixed support 3 also comprises an outer casing 18 within which is mounted a receiver circuit 19 for receiving signals from the receiver LEDs 15 and providing an output signal to a data processor for analysis.

Thus, in this embodiment the system of the invention is arranged to capture data from a large number of data sources, namely strain gauge transducers, on the rotor and to communicate between the rotor interface 2 and the fixed support 3 a set of three multiplexed signals which are subsequently demultiplexed on the receiver circuit 9 and transmitted to the data processor. The rotor interface 2 may be very conveniently mounted on the rotor by simply bolting at the flange 9 and making the necessary electrical connections between the transducers and the circuits 7. This is a very simple operation and allows very versatile operation of the communication system. A very important aspect of this arrangement is that there is no need for bearings in the system, as accurate alignment is not critical.

Figure 2:
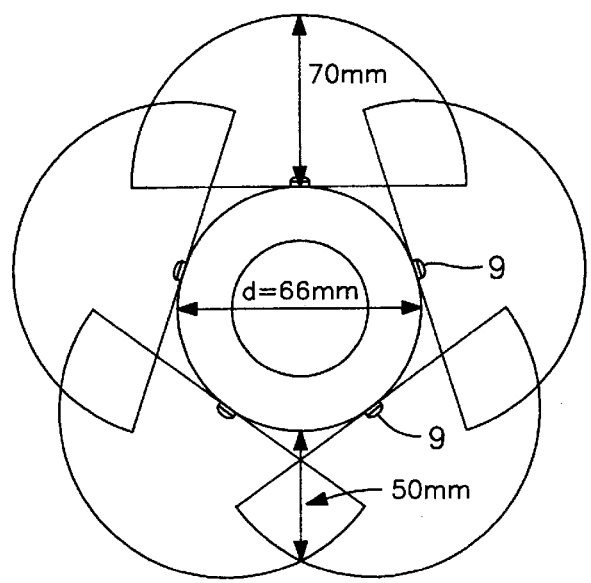
FIG. 2 is a diagram illustrating the emission fields of light emitters.
Figure 3:
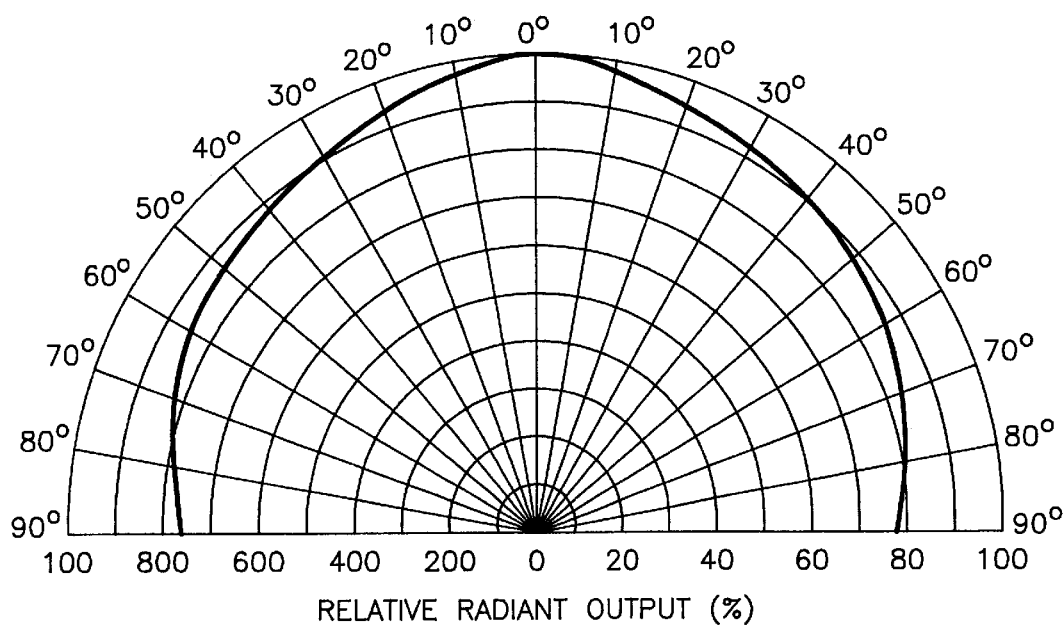
FIG. 3 is a diagram illustrating the angular emission pattern of the light emitters.

Referring now to FIG. 2, the arrangement of emitter LEDs 9 is illustrated. An important aspect of each of the emitters LEDs 9 is that it has a diverging emission field of at least 30°, and preferably at least 120°. In this embodiment, the emission field has an angle of divergence of 180° and thus, for a rotor interface diameter of 66 mm five emitter LEDs 9 are sufficient to provide a continuous signal because the fields of view overlap as illustrated in this diagram. The total radius of the field of view is 70 mm and the distance at the point of overlap is 50 mm. Thus, for any one ring of emitter LEDs 9, the corresponding receiver LED 15 will always receive a signal of good strength. The diagram at FIG. 3 illustrates the radiant output at various degrees, the maximum being at 0° and the minimum being at 90°. However, there is still a very strong signal at the 90°angle, namely 75% of the full output.

An important aspect of the invention is the fact that frequency modulation is utilised and thus the signal reception is independent of intensity to a large extent. It is only necessary that a sufficiently strong signal be received for clear pick-up. In order to avoid cross-talk between rings of the emitter LEDs 9, emitters in adjacent rings operate at different wavelengths. Differentiation by colour/wavelength may alternatively be achieved by use of optical baffles adjacent the receivers LEDs 15.

Figure 4:
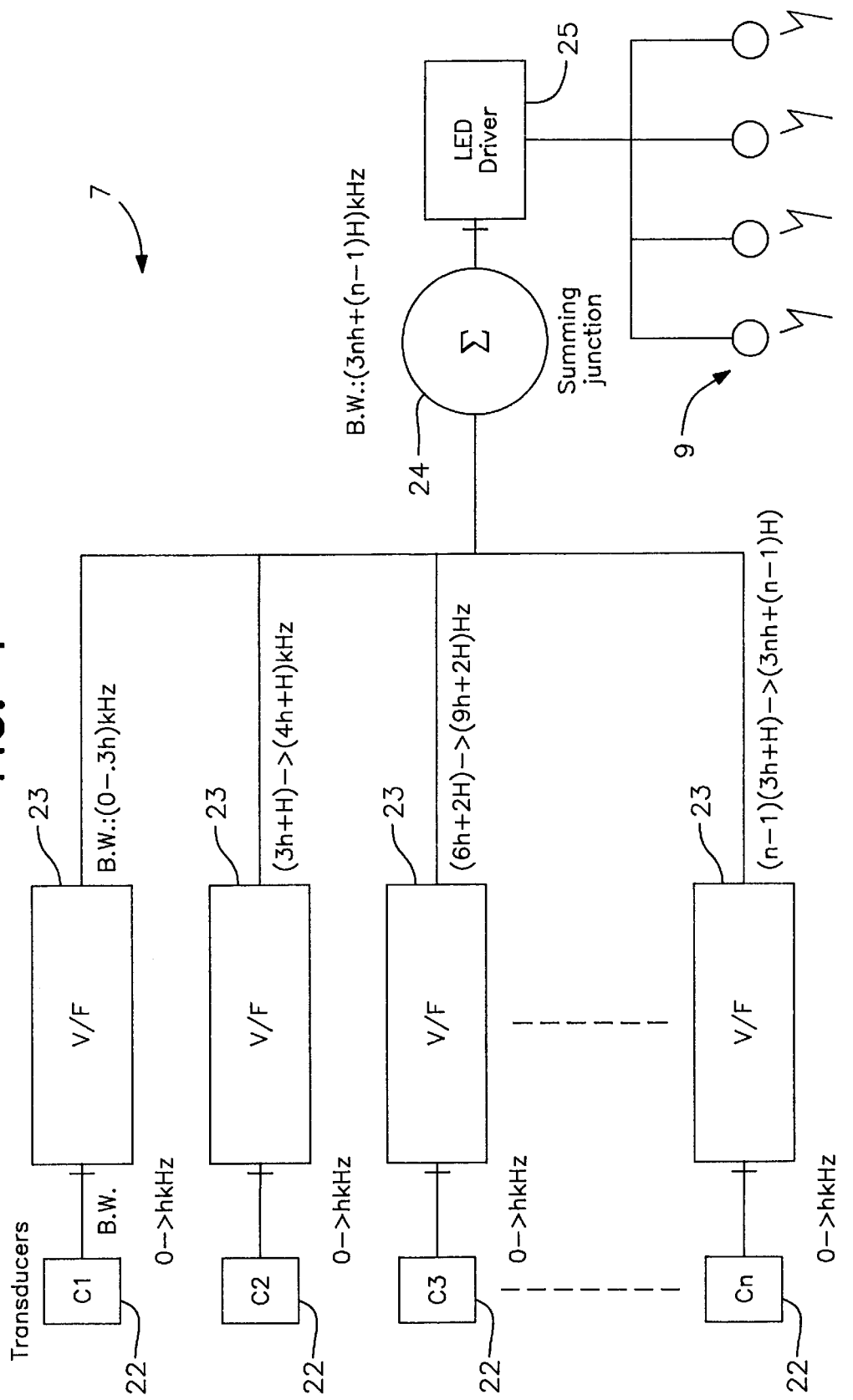
FIGS. 4 and 5 are diagrams illustrating the electronic construction of the system.
Figure 5:
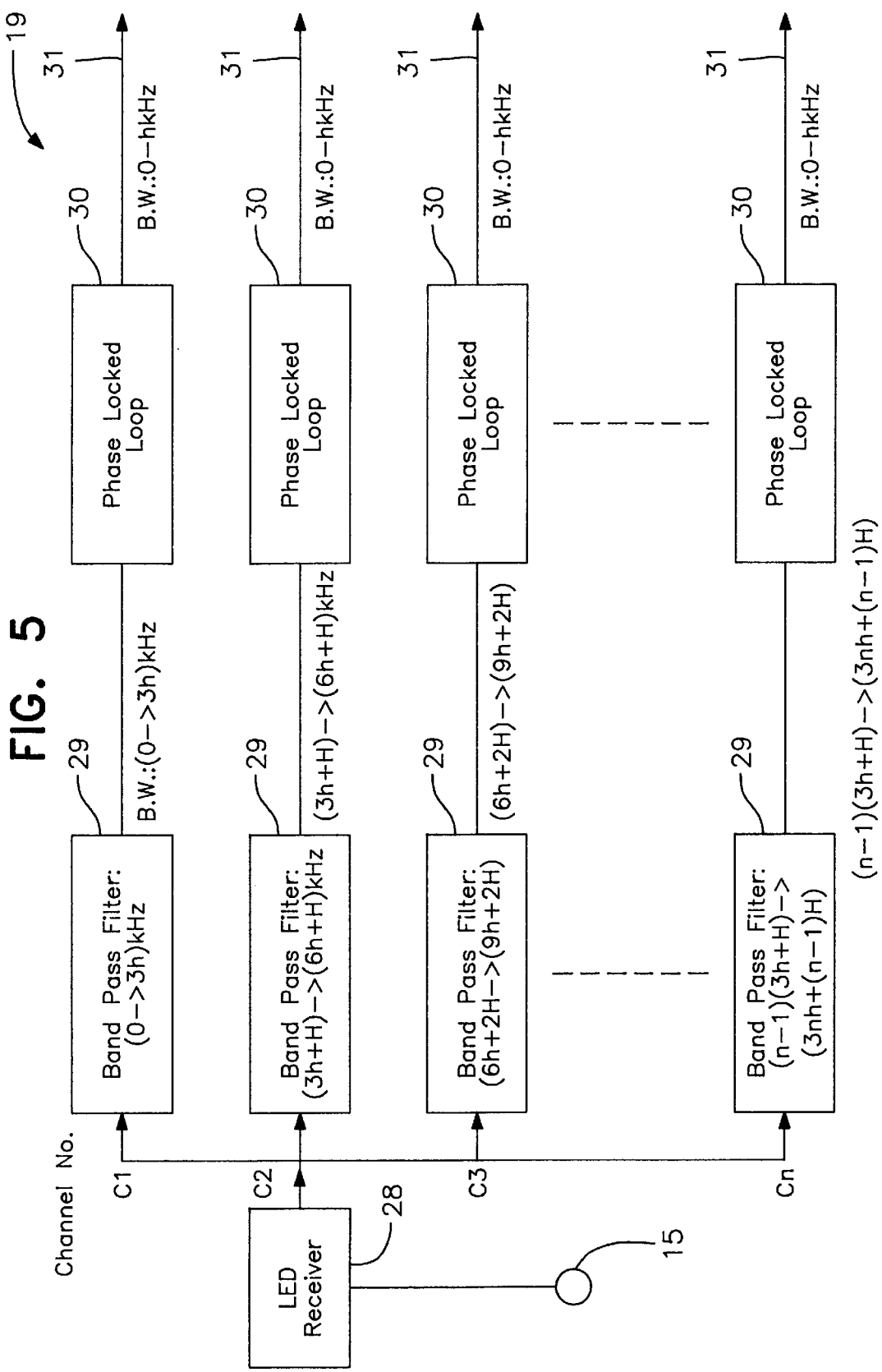

Referring now to FIGS. 4 and 5, the electrical and optical arrangement is now shown in more detail. Those parts on the rotor interface boards 7 are shown in FIG. 4, and those parts on the receiver circuit 19 are shown on FIG. 5. There is a set of n transducers 22 on the turbine blades associated with each ring of LEDs 9. Thus, the description referring to FIGS. 4 and 5 relates to a set of n channels Cl to Cn which arise from a single set of transducers and are communicated through a single ring of LEDs 9. This arrangement is duplicated for each additional one of the three rings 9.

The rotor interface 2 comprises a drive circuit mounted on the boards 7 which receives signal channels from the transducers 22 and drives the ring of LEDs 9. Thus, one drive circuit 15 is associated with each ring of LEDs 9. The drive circuit initially pre-amplifies the signals from the transducers to bring them from the mV range to the Volt range of 0 to 5 Volts. This pre-amplification is carried out by amplifiers on the boards 7.

The drive circuit also comprises a voltage to frequency converter 23 associated with each transducer 22. The output of the convertors 3 are connected to the input of a summing junction 24, the output of which is connected to an LED driver 25. The LED driver 25 drives all of the emitter LEDs 9 in a single ring with the same frequency division multiplexed signal. The receiver circuit comprises an LED receiver 28 connected to the receiver LED 15 associated with that emitter LED ring. The receiver 28 is in turn connected to n band pass filters 29, each of which is associated with a particular channel Cl to Cn. Each band pass filter 29 is connected to a phase locked loop 30 which provides the re-constituted analog transducer signal.

In more detail, each band pass filter is of the passive filter type having discrete components and is of the Butterworth design.

In operation, there are n channels of data from the transducers, each of which is inputted to a voltage to frequency converter 3. For frequency modulation each signal is moved in the frequency domain so it has a bandwidth of;

$$B.W.=(n-1)(3h+H)\rightarrow(3nh+(n-1)H),$$

where h is the required bandwidth of the signals and H is the necessary guard band between channels to avoid crosstalk. It has been found that to ensure correct real time data processing it is best to have H approximately equal to h. The number "3" represents a minimum of two times the Nyquist criterion for accurate digitisation of an analogue signal and is not necessarily fixed.

The maximum frequency of each band is given by:

$$f_{max}=3nh+(n-1)H$$

Generally the maximum number of channels that can be transmitted is limited by the bandwidth of the lowest bandwidth component used, $f'_{max}$. The maximum number of channels is therefore:

$$N_{max} = \frac{f'_{max} + H}{3h + H}$$

Following the V/F conversion the signals are summed and buffered and are ready for transmission. A ring of m emitter LEDs 9 are used for transmission and a single receiver LED 15 for collection of data from the rotor.

An important aspect of the invention is the fact that each of the emitter LEDs 9 has a diverging field of emitted light and they are positioned so that the receiver LED 15 at all times receives a signal from one or other of the LEDs 9. This signal is of varying intensity as the LEDs 9 rotate and the distance between each LED 9 and the receiver LED 15 continuously changes. However, because the signals are frequency modulated, this does not affect quality of the received signal. The receiver LED 15 receives a frequency division multiplexed signal and the receiver 28 boosts the low amplitude signals with a Schmitt trigger.

The band pass filters 29 then divide the signal into n identical channels. Each channel is filtered with a bandwidth of 3 h to return the data array to the same condition that it was in after V/F conversion, The array of original analog signals is therefore reconstructed by the phase-lock loop circuit 30.

It will thus be appreciated that the invention provides for communication of information between a high speed rotor and a fixed support in an extremely effective manner. The type of modulation used ensures that there is a good quality signal. By using frequency-division modulation, there is effectively parallel communication and this helps to ensure that real time processing can be carried for correct analysis of behaviour of the rotating system. This is particularly important where the rotor is a turbine in which there are transducers on the turbine blades and phenomena such as shock waves travelling through the blades must be monitored in real time. The manner in which voltage to frequency conversion and the band pass filtering are carried out help to ensure that integrity of the signals is maintained in such an environment. The invention allows for very compact data communication with many data channels taking up very little space.

The invention is not limited to the embodiments described, but may be varied within the scope of the claims in construction and detail. For example, there may be a number of receivers and only a single emitter, in which the diverging emission field of the emitter helps to ensure that there is always reception at one of the receivers. This arrangement would allow effective communication of the information, however, it is not as simple as the arrangement described. It is also envisaged that data may be communicated from a fixed support on to the rotor so that the communication path is effectively reversed. It is also envisaged that the emitter LEDs need not necessarily be mounted in a ring in which the emission fields extend radially outwardly. For example, they may be mounted in a ring on an end face of the rotor interface so that the emission fields extend in an axial direction. Alternatively, they may be mounted on axial facing annular rings on a stepped shaft. Further, contactless power may alternatively be provided by a capacitive power supply. Elimination of cross talk may be achieved by use of colour filters instead of different colour rings of imager LEDs 9.

I claim:

1. An optical slip ring for communication of data with a rotor, the slip ring comprising at least one light emitter mounted on the rotor or on an adjacent fixed support, at least one light receiver on the other of the rotor or fixed support, a drive means for delivering data signals to each light emitter, and a receiver means for receiving data signals from each light receiver and providing an output signal, wherein each light emitter emits light in an emission field diverging at an angle of divergence of at least 30°, the drive means comprises means for connecting to a transducer, a voltage to frequency converter, and means for delivering frequency modulated data signals to each light emitter, the receiver means comprises means for demodulating said frequency modulated data signals, and the slip ring further comprises:

a rotor interface comprising a flange for removable on-axis attachment to the rotor and means for supporting the drive means and each light emitter or the receiver means and each light receiver, a fixed support for the other of the light receiver and the receiver means or the light emitter and the drive means, and means for moving the fixed support relative to the rotor interface in a sliding motion to a position at which the light receivers and emitters are within range and there is no physical connection between the fixed support and the rotor interface.

2. An optical slip ring as claimed in claim 1, wherein the frequency modulated data signals are modulated at a frequency of at least 500 kHz.

3. An optical slip ring as claimed in claim 2, wherein the angle of divergence of emitted light is at least 120°.

4. An optical slip ring as claimed in claim 1, wherein a plurality of emitters are arranged in a ring about the rotor axis of rotation at a spacing such that the emission fields overlap.

5. An optical slip ring as claimed in claim 1, wherein there are a plurality of rings of emitters.

6. An optical slip ring as claimed in claim 1, wherein there are a plurality of rings of emitters and the slip ring comprises means for differentiating signals from adjacent rings.

7. An optical slip ring as claimed in claim 6, wherein the emitters of adjacent rings operate at mutually different colour wavelengths.

8. An optical slip ring as claimed in claim 7, wherein said differentiation means comprises light filters mounted adjacent the receivers.

9. An optical slip ring as claimed in claim 1, wherein the drive means comprises means for connecting to a plurality of signal sources, and means for frequency-division multiplexing the data signals delivered to each light emitter.

10. An optical slip ring as claimed in claim 9, wherein the drive means comprises means for multiplexing with a guard to channel bandwidth ratio of approximately 1:1.

11. An optical slip ring as claimed in claim 9, wherein said receiver means comprises passive band pass filters for demultiplexing the data signal.

12. An optical slip ring as claimed in claim 11, wherein the filters are of the Butterworth type.

13. An optical slip ring as claimed in claim 1, wherein the slip ring fixed support is in the form of a sleeve shaped to surround part of the rotor interface.

14. An optical slip ring as claimed in claim 1, wherein the slip ring further comprises an electrical field-coupled power supply for contactless transfer of power to components on the rotor interface.

15. An optical slip ring as claimed in claim 14, wherein the power supply is inductive and comprises a primary AC winding on the fixed support and a secondary winding on the rotor interface.

16. An optical slip ring as claimed in claim 14, wherein the rotor interface comprises a DC rectifier and power regulation circuit.

17. An optical slip ring as claimed in claim 1, wherein the drive means comprises circuits which are mounted on at least one circuit board which is substantially circular in shape and mounted about the axis of rotation.

* * * * *